United States Patent
Detlefs et al.

(10) Patent No.: US 6,999,980 B2
(45) Date of Patent: Feb. 14, 2006

(54) ELIMINATING WRITE BARRIERS FOR YOUNG OBJECTS

(75) Inventors: David L. Detlefs, Westford, MA (US); William D. Clinger, Franklin, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 429 days.

(21) Appl. No.: 10/295,325

(22) Filed: Nov. 15, 2002

(65) Prior Publication Data

US 2004/0039759 A1 Feb. 26, 2004

Related U.S. Application Data

(60) Provisional application No. 60/405,485, filed on Aug. 23, 2002.

(51) Int. Cl.
  *G06F 17/30* (2006.01)
(52) U.S. Cl. ..................... 707/206; 707/200
(58) Field of Classification Search ......... 707/1–104.1, 707/200–206
See application file for complete search history.

(56) References Cited

U.S. PATENT DOCUMENTS

| | | | | |
|---|---|---|---|---|
| 4,907,151 A | * | 3/1990 | Bartlett | 711/166 |
| 4,989,134 A | * | 1/1991 | Shaw | 707/206 |
| 5,088,036 A | * | 2/1992 | Ellis et al. | 707/206 |
| 5,421,015 A | * | 5/1995 | Khoyi et al. | 718/107 |
| 5,930,807 A | * | 7/1999 | Ebrahim et al. | 707/206 |
| 5,953,736 A | * | 9/1999 | O'Connor et al. | 711/6 |
| 6,308,185 B1 | * | 10/2001 | Grarup et al. | 707/206 |
| 6,496,871 B1 | * | 12/2002 | Jagannathan et al. | 719/317 |
| 6,560,774 B1 | * | 5/2003 | Gordon et al. | 717/146 |
| 2002/0032719 A1 | * | 3/2002 | Thomas et al. | 709/107 |

OTHER PUBLICATIONS

Oracle, "Programmer's Guide to the Oracle Call Interface", Copyright 1997 Oracle Operation, ppl. 1-15.*
Urs Hölzle, "A Fast Write Barrier for Generational Garbage Collectors," OOPSLA'93 Garbage Collection Workshop, Oct. 1993, Washington, D.C. , pp. 1-6.

* cited by examiner

*Primary Examiner*—Luke S Wassum
*Assistant Examiner*—Linh Black
(74) *Attorney, Agent, or Firm*—Kudirka & Jobse, LLP

(57) ABSTRACT

In a computer system that uses a generational garbage collector in which objects are promoted from a "young" generation to an "old" generation, a compiler output designates certain dynamic-allocation instructions as being ones whose resultant allocated objects will be considered "pinned." The compiler associates with such allocation instructions respective segments of the code following the instructions and objects allocated within one of those segments are considered to remain pinned until program execution passes beyond that segment. The garbage collector refrains from promoting any pinned object, and as a consequence, an instruction that writes a reference into an object field while that object is pinned does not need to be accompanied by a write barrier.

33 Claims, 8 Drawing Sheets

```
1    Foo f = new Foo();
2    f.r1 = o1;          // Write barrier; plus for pinning.
3    Bar b = new Bar();   // Another allocation; minus for pinning.
4    if (b) {
5       f.r2 = o2;       // Write barrier; plus for pinning.
6    } else {
7       m();             // Random call; might do other pinned allocations.
8    }
9    f.r3 = o3;          // Another write barrier;
```

```
1   Class A {
2     public int i;
3   }
4
5   class B {
6     public A a;
7   }
8
9   class Test {
10    static void alloc_a_lot_of_garbage() {
11      for (i = 0; i < 10000; i++) {
12        int[] ia = new int[10000];
13      }
14    }
15    public static void main(String[] args) {
16      B b = new B();
17      alloc_a_lot_of_garbage();
18      A a = new A();
19      b.a = a; /* Requires barrier. */
20      a = null;
21      alloc_a_lot_of_garbage();
22    }
23  }
```

FIG. 5

```
1  st [reg_b + A_OFFSET] := reg_a
2  reg_g1 = reg_b + A_OFFSET;
3  reg_g1 = reg_g1 >> 7;
4  st [reg_ctb + reg_g1] := DIRTY_CARD;  // DIRTY_CARD is usually 0,
5                                        // available as a constant register.
```

FIG. 6

```
1   Foo f = new Foo();
2   f.r1 = o1;         // Write barrier; plus for pinning.
3   Bar b = new Bar(); // Another allocation; minus for pinning.
4   if (b) {
5     f.r2 = o2;       // Write barrier; plus for pinning.
6   } else {
7     m();             // Random call; might do other pinned allocations.
8   }
9   f.r3 = o3;         // Another write barrier;
```

FIG. 9

```
1   public class Nasty {
2       Nasty next;
3       Nasty (int n, Nasty p) {
4           while (n > 0) {
5               n = n – 1;
6               p = new Nasty (n, p);
7           }
8           this.next = p;
9       }
10  }
```

```
1   if (b) {
2       Foo f = new Foo();
3       f.r = o;
4   } else {
5       m();
6   }
7   i = 17;
```

ELIMINATING WRITE BARRIERS FOR YOUNG OBJECTS

CROSS-REFERENCE TO RELATED APPLICATIONS

The present application claims the benefit of U.S. Provisional Patent Application Ser. No. 60/405,485, which was filed on Aug. 23, 2002, by David L. Detlefs and William Clinger for Eliminating Write Barriers for Young Objects and is hereby incorporated by reference.

BACKGROUND OF THE INVENTION

1. Field of the Invention

The present invention is directed to memory management. It particularly concerns what has come to be known as "garbage collection."

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs can be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. The data and instructions for operating on them that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in microprocessor 11's on-board cache rather than on the RAM 14, with which those caches swap data and instructions just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, a single location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when the determination of whether memory space will be allocated to a given object is made only at run time.

Dynamic allocation has a number of advantages, among which is that the run-time system is able to adapt allocation to run-time conditions. For example, the programmer can specify that space should be allocated for a given object only in response to a particular run-time condition. Conversely, the programmer can specify conditions under which memory previously allocated to a given object can be reclaimed for reuse. The C-language library functions malloc( ) and free( ) are often used for such run-time allocation and reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically. Particularly for long-lived applications, though, dynamic-memory allocation and reclamation must be performed carefully. If the application fails to reclaim unused memory—or, worse, loses track of the address of a dynamically allocated segment of memory—its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed.

Because of human limitations, managing dynamic memory explicitly by using interfaces like malloc( )/free( ) often leads to these problems. Whereas a programmer working on a particular sequence of code can perform his task creditably in most respects with only local knowledge of the program at any given time, memory allocation and reclamation require more-global knowledge. Specifically, a programmer dealing with a given sequence of code does tend to know whether some portion of memory is still in use by that sequence of code. But it is considerably more difficult for him to keep track of what all the rest of the program does with that memory.

A way to reduce the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are. If so, the thereby-referenced dynamically allocated objects are considered reachable, too. Clearly, an object referred to in the processor's call stack is reachable, as is an object referred to by register contents. And an object referred to by any reachable object is also reachable.

Automatic garbage collectors obtain the global knowledge required for proper dynamic memory management by tracing references from some collector-appropriate notion of a "root set," e.g., global variables, registers, and the call stack. By using a garbage collector, the programmer is relieved of the need to worry about the application's global state and can concentrate on (more-manageable) local-state issues. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that carry the digital data by which the computer systems exchange that code are exemplary forms of carrier waves transporting the information.

The input to the compiler is the application source code, and the end product of the compiler process is application object code. This object code defines an application 21, which typically operates on input such as files, mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims memory space containing unreachable objects.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be configured to emulate. This conversion into byte codes is almost always separated in time from those codes' execution, so FIG. 3 divides the sequence into a "compile-time environment" 25 separate from a "run-time environment" 26, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted electrically or optically to the virtual-machine-implementing processor.

In some implementations, much of the virtual machine's action in executing these byte codes is most like what those skilled in the art refer to as "interpreting," so FIG. 3 depicts the virtual machine as including an "interpreter" 28 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 29. The arrangement of FIG. 3 differs from FIG. 2 in that the compiler 23 for converting the human programmer's code does not contribute to providing the garbage-collection function; that results largely from the virtual machine 27's operation.

Those skilled in that art will recognize that both of these organizations are merely exemplary, and many modern system employ hybrid mechanisms, which partake of the characteristics of traditional compilers and traditional interpreters both. The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically called an interpreter.

Now, some of the functionality that source-language constructs specify can be quite complicated, requiring many machine-language instructions for their implementation. One quite-common example is a source-language instruction that calls for 64-bit arithmetic on a 32-bit machine. More germane to the present invention is the operation of dynamically allocating space to a new object; this may require determining whether enough free memory space is available to contain the new object and reclaiming space if there is not.

In such situations, the compiler may produce "inline" code to accomplish these operations. That is, all object-code instructions for carrying out a given source-code-prescribed operation will be repeated each time the source code calls for the operation. But inlining runs the risk that "code bloat" will result if the operation is invoked at many source-code locations.

The natural way of avoiding this result is instead to provide the operation's implementation as a procedure, i.e., a single code sequence that can be called from any location in the program. In the case of compilers, a collection of procedures for implementing many types of source-code-specified operations is called a runtime system for the language. The compiler and its runtime system are designed together so that the compiler "knows" what runtime-system procedures are available in the target computer system and can cause desired operations simply by including calls to procedures that the target system already contains. To represent this fact, FIG. 3 includes block 30 to show that the compiler's output makes calls to the runtime system as well as to the operating system 31, which consists of procedures that are similarly system resident but are not compiler-dependent.

Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function. In short, garbage collectors can be implemented in a wide range of combinations of hardware and/or software.

The invention to be described below is applicable to most such systems, so long as they are of the "generational" variety. Generational garbage collection is distinguished by the fact that the "heap" of dynamically allocable memory is divided into a "young generation" and one or more "old generations." Most if not all objects are allocated initially in the young generation. If an object remains reachable after some period of time, it is "promoted" into an old generation, which is managed differently from the young generation. To understand the reason for dividing the heap into generations, it helps to recall certain garbage-collection basics, which we will now review.

Garbage collection involves searching through the heap for objects to which there are no chains of references from the root set. When the collector finds such objects, it returns the memory space that they occupy to its list of free space available for new-object allocation. A measure of a collector's efficiency is the amount of memory space it can thereby free in a given amount of collector execution time.

Now, it has been observed empirically that in most programs most dynamically allocated objects are used for only a short time. An implication of this fact for garbage collectors is that they will tend to be more productive if they spend their time disproportionately in parts of the heap where objects have been allocated most recently. If a collector treats a portion of the heap as a young generation, in which it allocates most or all new objects, then performing its activity disproportionately in the younger generation will tend to yield greater collector efficiency and thus greater efficiency of the application that employs the collector's services.

Further advantages follow from the fact that write operations in most applications tend to occur disproportionately in the fields of newly allocated objects. To appreciate those advantages, it is necessary to understand a further typical feature of generational garbage collectors, namely, the use of so-called remembered sets. We now turn to a discussion of that feature.

A typical generational garbage collector's young generation occupies only a fairly small proportion of the entire heap. The collector searches that portion very frequently for garbage. To do so, it typically interrupts the mutator, i.e., the non-garbage-collector part of the application. Also typically, a large number of these "minor cycles" of young-generation collecting occur for each "major cycle" of older-generation collecting.

Although in a minor cycle the collector may scan only the relatively small young generation for reachable objects, the number (and lengths) of reference chains leading from the root set can be large, with many extending into the (typically large) old generation. Usually, though, very few of the chains that include references in the old generation lead to objects in the new generation. Instead of following reference chains into the old generation, therefore, the collector will typically rely on "remembered sets." A remembered set is a data structure that is associated with a generation (in this case, the young generation) or portion thereof and that lists locations in the heap where references to objects in that generation or portion thereof may be found. Instead of following all reference chains into the old generation, the garbage collector can restrict its attention to only the regions that the remembered set's entries identify. If a young-generation object is not referred to by a reference thus found, the collector can conclude that the object is not reachable through the old generation, so it is garbage if it is not reachable directly from a root or through a reference chain from a root that involves only young-generation objects. The number of such references in the old generation tends to be small, not only because the young generation itself is small but also because older objects tend not to refer to younger ones.

To enable the collector to maintain remembered sets, the mutator must communicate with the garbage collector to tell it when the mutator has modified a heap-located reference that potentially identifies a heap-allocated object. The mechanism used for this purpose is known as a "write barrier." Whenever source code calls for a reference to be written, the compiler will insert into the object code additional instructions that record the fact of that operation in a data structure to which the garbage collector will later refer. Specifically, the garbage collector refers to that data structure during the garbage-collection cycle in order to update the remembered sets. Since in most programs such write operations take place primarily in the young generation, not many entries need to be made in the data structure that keeps track of how many old-generation objects have been "dirtied" by a reference write. So a minor-cycle collection can be performed efficiently.

But the write barriers that make it possible to maintain such data structures exact a performance penalty: reference writing requires that the mutator execute more instructions than it would have to if it did not need to communicate with the collector. To a degree, therefore, obtaining such collector efficiency exacts a mutator-performance cost.

SUMMARY OF THE INVENTION

We have found a way of reducing this performance cost. According to the invention, the compiler sometimes designates a program segment following an object's allocation as one in which that object's promotion to the old generation is prohibited. Within that program segment, any write operation to a reference that the object contains will not be provided with a write barrier, and the criteria upon which a collector employing the invention bases its decision as to whether an object should be promoted will include whether the mutator's execution has passed beyond the segment in which the object's promotion is prohibited.

It turns out that omitting write barriers in such circumstances does not prevent any necessary mutator-to-collector communication, because write barriers for references in the young generation are really unnecessary, as will be explained below. Since the collector avoids promoting an object out of the young generation until the mutator has passed the point where it executes such write operations without write barriers, this approach causes no reference writing in old-generation objects without accompanying write barriers.

BRIEF DESCRIPTION OF THE DRAWINGS

The invention description below refers to the accompanying drawings, of which:

FIG. 5 is a code-fragment listing showing source code that illustrates the need for a write barrier;

FIG. 6 is an assembly-code listing of a write barrier;

FIG. 9 is a source-code listing used to illustrate the process of locating what will be referred to below as "unpinning locations";

DETAILED DESCRIPTION OF AN ILLUSTRATIVE EMBODIMENT

Figure 1:
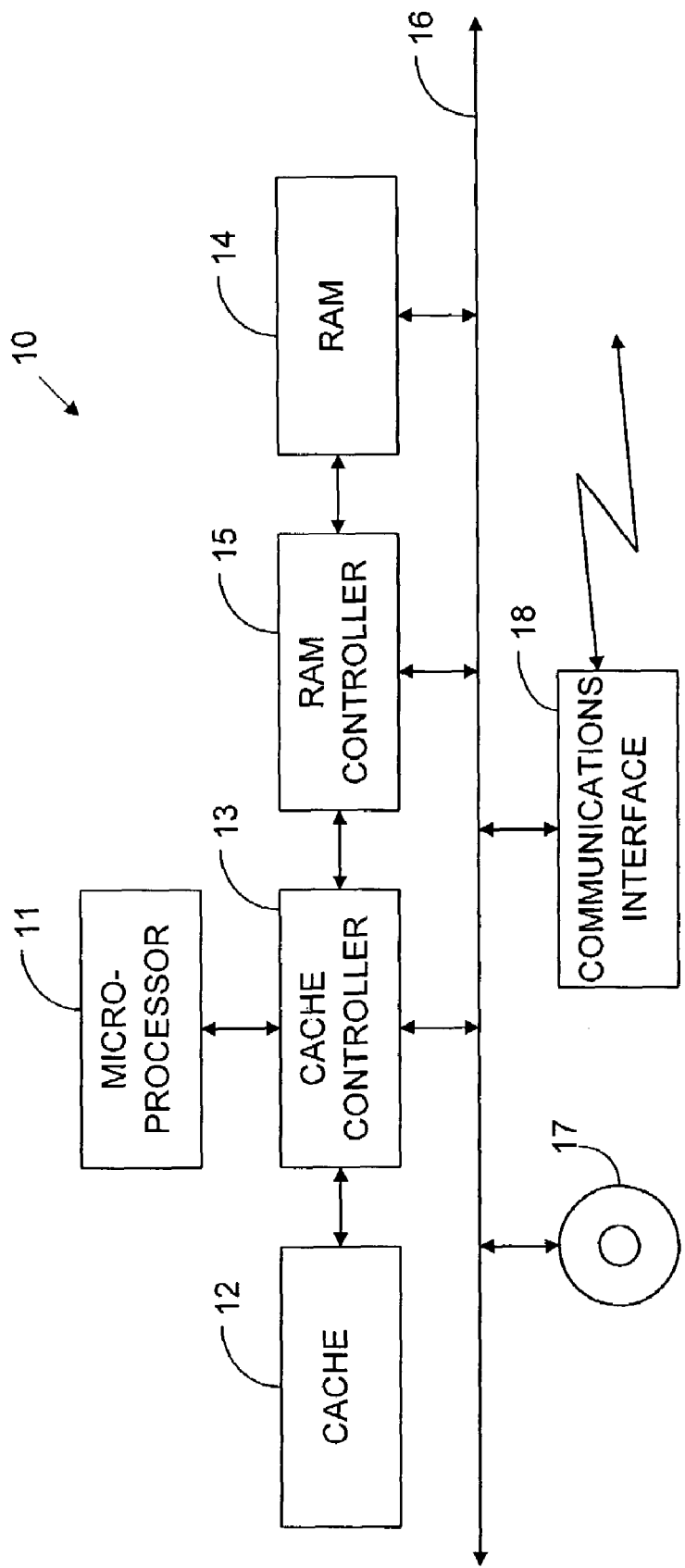
FIG. 1, previously discussed, is a block diagram of a computer system of a type in which the present invention's teachings can be practiced.
Figure 2:
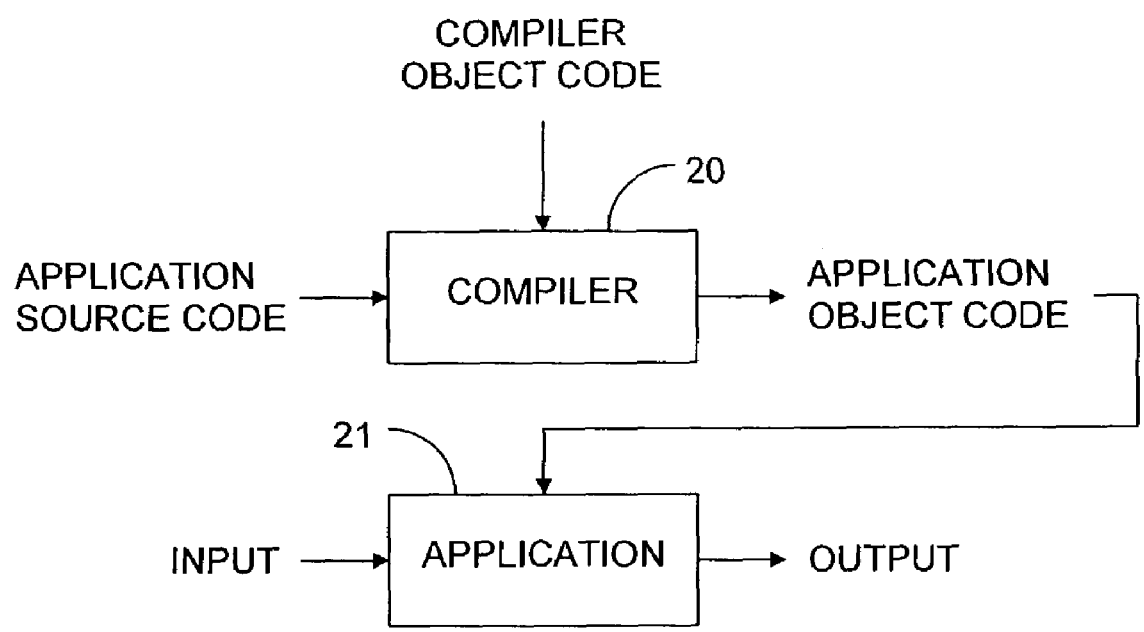
FIG. 2, previously discussed, is a block diagram illustrating a simple source-code-compilation operation.
Figure 3:
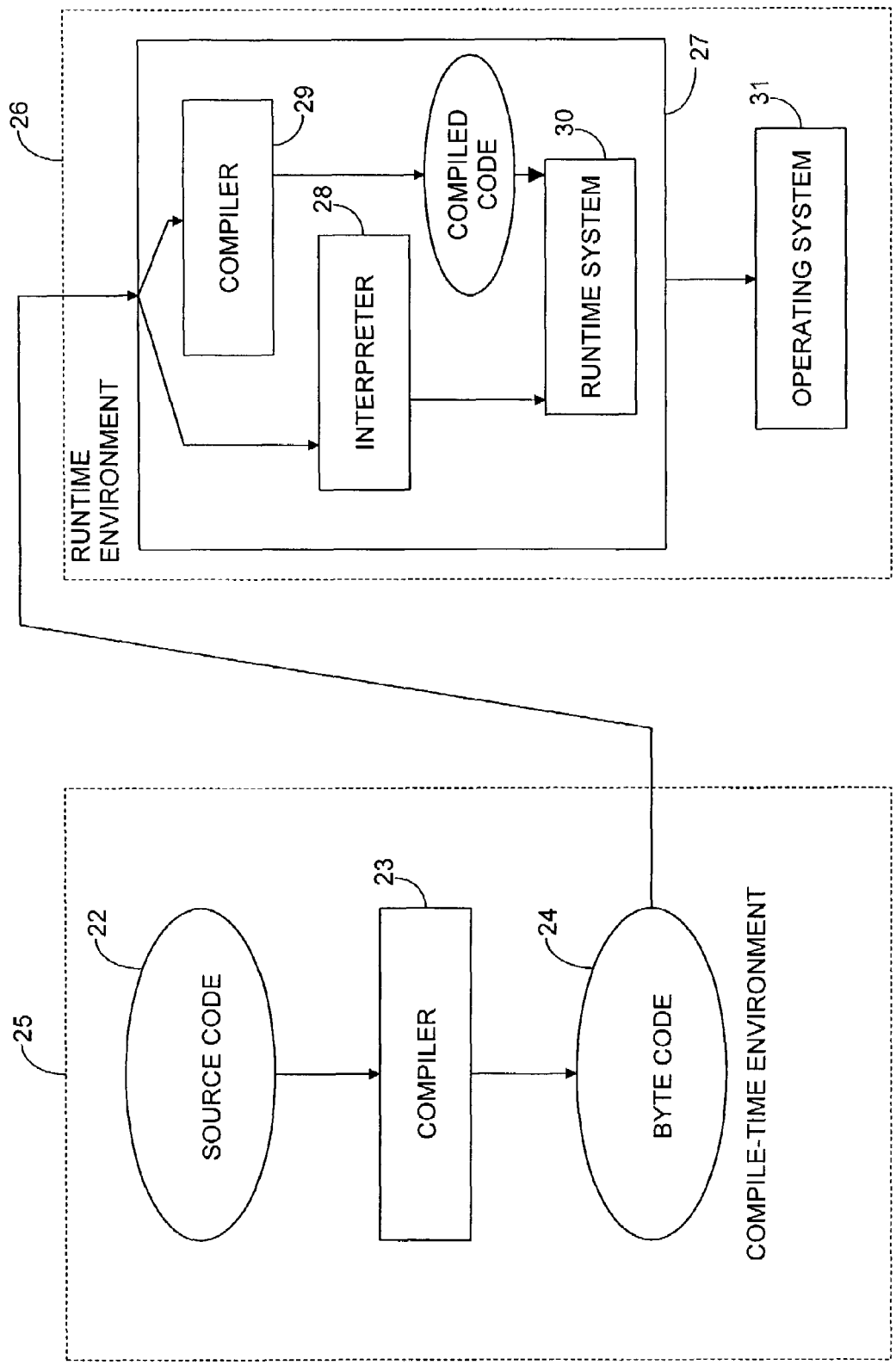
FIG. 3, previously discussed, is a block diagram of a more-complex conversion of source code into an operating application.
Figure 4:
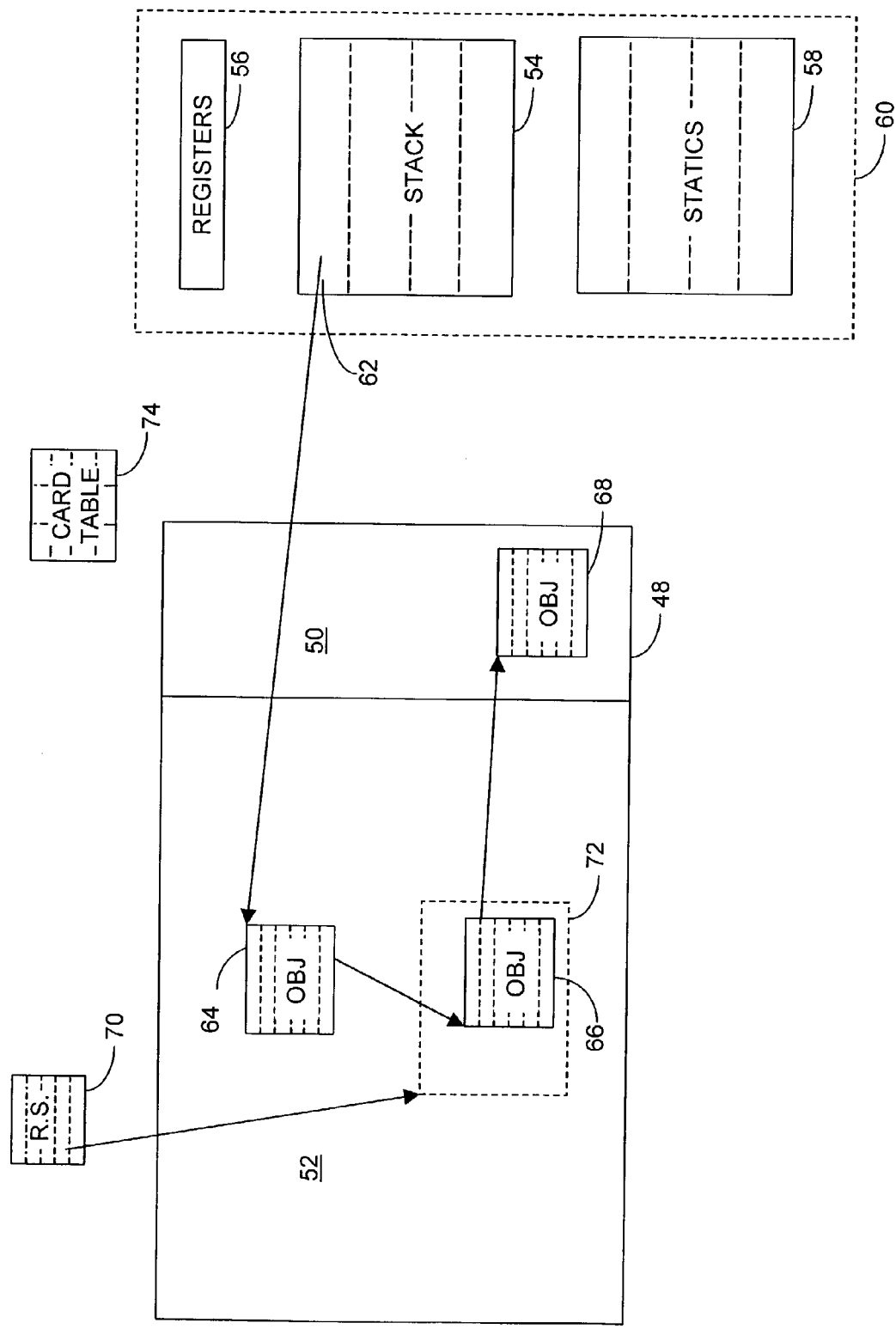
FIG. 4 is a diagram of selected parts of a memory space used by a process that employs a garbage-collected heap.

In FIG. 4, a heap 10 contains dynamically allocated objects. FIG. 4 depicts the heap as divided into a relatively small young generation 50 and a much larger old generation 52. When the mutator reaches a point at which the code calls on the run-time system to allocate memory space to an object, the run-time system will ordinarily allocate that space in the young generation 50. (Some systems make exceptions for large objects or arrays, which may instead be allocated in the old generation.)

During garbage-collection cycles, the garbage collector searches the heap 10 for objects that have been allocated but that the program will no longer use. There are many ways in which system resources can be divided between the mutator and the garbage collector. For the sake of concreteness, though, let us assume that a part of the allocation process is for the run-time system to determine how much room is left in the young generation 50 and, if the amount of room left is small, to preempt the mutator's thread of execution and have the garbage collector perform a garbage-collector cycle.

It will be convenient in the present discussion to consider only minor-cycle (young-generation) cycles initially. We will also assume for the sake of discussion the relatively common example of a "stop-the-world" collector, which stops mutator execution while it is collecting the young generation. Such interruptions could annoy an application's user if they take too long, but they will be relatively short if the young generation is small, as FIG. 4 suggests.

As was mentioned above, the general garbage-collection task is for the collector to identify objects that the mutator will no longer use. Reflection reveals that the program will not use an object if there is no chain of references to it that begins in an active frame of the call stack 54, a register 56, or a static variable, which the drawing represents for the sake of illustration as being contained in a static-variable segment 58 of the process's memory space. Together, these potential reference locations are referred to as a "root set" 60. The most-straightforward way of identifying objects that are reachable and thus not garbage is therefore to follow all references (identified as such in accordance with conventional garbage-collection techniques) from this root set 60. If an object in the young generation is in any resultant reference chain, the collector would consider it to be reachable.

In practice, though, a generational collector will more often employ a modified form of this approach. To illustrate this modified approach, let us assume that a reference 62 in an execution thread's call stack 54 points to an object 64 in the old generation. Let us assume further that object 64 includes a reference that points to a further old-generation object 66, which in turn contains a reference to a young-generation object 68. That object is reachable and therefore should not be considered garbage.

But thus following chains through the potentially very large old generation is usually considered too time-consuming and inefficient. This is because it has been observed empirically that in most programs relatively few reference chains leading into the old generation contain references from old-generation objects to young-generation objects. So following such chains is in most cases a waste of time.

To avoid the cost that following such reference chains would exact, a typical generational garbage collector will employ a "remembered set," which FIG. 4's block 70 represents. The remembered set includes entries that identify respective old-generation regions that may include references into the young generation. To illustrate this, FIG. 4 shows a region 72 depicted as pointed to by one of remembered set 70's entries. By searching only old-generation regions thus identified, the collector avoids spending the potentially large amount of time that following all reference chains into the old generation would require.

Now, the young-generation objects thereby determined to be reachable may actually be garbage, because the old-generation object containing the reference to it may itself be garbage. But thus occasionally failing to reclaim the space occupied by a garbage object at the young-generation stage is usually considered acceptable; such objects will usually be identified as garbage after they are promoted into the old generation.

The discussion so far has not explained how the remembered set 70 is so maintained that it identifies regions where such references may occur. Although there are many conventionally employed ways to maintain remembered sets, nearly all involve using write barriers. As was mentioned above, that is, object code that writes into a reference's location will be accompanied by code for making some type of record of that operation in a memory location used by the garbage collector in support of its remembered-set maintenance. In theory, for example, the compiler could accompany the instruction for writing a reference value with instructions for writing an appropriate entry into the remembered set 70 if that reference refers to an object in the young generation. But thus writing directly into the remembered set is not usually considered practical, since necessary duplicate-entry-avoidance steps are too expensive to be performed as frequently as conventional write-barrier use would necessitate.

A more-typical approach is for the write barrier simply to make an entry in a separate data structure 74, which we will call for the sake of example a "card table." Specifically, it will place a mark into a card-table location corresponding to a region of the old generation 52 in which the reference was written. This does not necessarily tell whether the reference refers to a young-generation location, but it will tell where a reference that potentially refers to a young-generation object may be located, and it automatically performs duplicate elimination at no expense. When a garbage-collection cycle thereafter occurs, the garbage collector searches the old-generation regions that the card table 74 identifies as having been modified, and it updates the remembered set 70 accordingly if it finds references to young-generation objects.

To appreciate how the need for a write barrier can arise, consider the source code set forth in FIG. 5. In that code, which is written in the Java programming language, the fifteenth line begins a method main( ), in which the first step is to allocate space in the heap for an object b of class B. The next step, set forth in the drawing's seventeenth line, is to call a method called alloc_a_lot_of_garbage( ). As the tenth through fourteenth lines indicate, that method allocates a large number of large integer arrays. Like the memory space allocated to object b in the sixteenth-line step, the memory space allocated to these arrays is initially located in the young generation. But we will assume for purposes of illustration that allocating so many large arrays causes the young generation to be filled up many times and thereby triggers minor collection cycles. By the time the alloc_a_lot_of_garbage( ) method has finished executing, therefore, object b has survived enough collection cycles for it to have been promoted into the old generation.

After alloc_a_lot_of_garbage( ) returns, the main( ) routine calls for allocation of a new object a of type A, as FIG. 5's eighteenth line indicates. This new object a will be allocated in the young generation. As FIG. 5's sixth line indicates, old-generation object b includes a reference field, and the nineteenth line shows that the main( ) method writes into that field. Specifically, it writes into that field a reference to object a. This reference-write operation is what gives rise to the need for a write barrier.

To appreciate why, first assume that a collection cycle occurs immediately after the nineteenth-line step. In inspecting the stack (which is part of the root set), the collector will find that local variable a contains a reference to young-generation object a. Even without use of the remembered set, which is what write barriers support, that object can be recognized as reachable.

Now assume instead that the collection cycle occurs when the twenty-first-line step forces a collection cycle. Since the twentieth-line step will at that time have removed the local-variable reference to young-generation object a, there will be no direct reference to object a from the root set; the only reference chain from the root set to that object will include object b. But object b is in the old generation, and, as was explained above, the collector will not follow reference chains into the old generation. So object a will not be recognized as reachable when the twenty-first-line step forces a garbage collection unless, by executing the write barrier associated with the nineteenth-line step, the mutator has notified the collector of the fact that a reference had been modified in the old-generation region that contains object b's field a. Since the code produced by the compiler includes such a write barrier, though, the collector will look in that region, find that a reference to object a exists, and conclude that object a may not be garbage.

The precise nature of the write barrier will vary from system to system. For the sake of concreteness, though, FIG. 6 gives assembly-language code representing the machine-language instructions that a compiler may produce to guard a reference-writing operation. FIG. 6's first line is the assembly-language representation of machine code that could be used to implement the step of FIG. 5's nineteenth line. Here it is assumed that a register called reg_b contains the address of object b, and A_OFFSET is the offset to that object's field a. If another register, reg_a, contains the address of object a, then the operation for which FIG. 6's first line calls places into object b's field a a reference to object a.

This step is all that FIG. 5's nineteenth-line source-code instruction calls for explicitly. But the compiler will additionally include the write barrier that FIG. 6's second through fourth lines illustrate. The write barrier illustrated there is one for a system in which the mutator marks a card table to record the fact that a reference has been written. A card table contains respective entries for each of a plurality of regions into which the collector considers the heap to be divided. The regions into which the heap is divided for this purpose are often referred to as "cards." To indicate that the reference modification has occurred in the card that contains object b's field a, the write barrier must first compute the location of the card-table entry corresponding to the card that contains that field.

To this end, FIG. 6 places that field's address in a register reg_g1. For the sake of illustration, we assume that each card contains 128 bytes. If each card-table entry occupies one byte, therefore, the offset of the desired entry from the beginning of the card table can be determined by merely right-shifting by seven ($2^7$=128) the number representing the reference's address. This is the step that FIG. 6's third line performs. (For the sake of simplicity, we have assumed that the heap addresses—atypically—begin at zero.) FIG. 6's fourth line represents adding this offset to the card-table start address and placing into the location thereby computed a value representing the fact that a change has been made to that card.

Again, this is merely an example of one type of write barrier. Note that this type of write barrier does not tell where within the card the reference has been modified; the burden of finding the reference within that card is left to the collector. This is a typical approach, but some others may give the collector more information or be more selective about which reference-writing operations will be thus reported. In some cases, for instance, the code may test the reference's value and report its modification only if the result refers to a location in, say, the young generation.

Even if the compiler uses only the simple type of write barrier just described, write-barrier use adversely affects mutator performance. The present invention reduces this adverse affect by eliminating write-barrier use in many situations. Before we describe in detail how it does so, though, we will describe certain further typical collector features that will be helpful in explaining the present invention's advantages.

Various generational collectors have different ways of treating young-generation objects that they identify as being reachable. In some collectors, reachable objects' locations can simply be noted for use in updating the free list used by the runtime system to allocate objects in the young generation. In others, all such reachable young-generation objects are immediately promoted into the old generation during their first collection cycle. Promotion almost invariably means that the object is copied into a location in the old generation.

In another common approach, the young generation is divided into two "semispaces," and, during the mutator-execution interval between any two collection cycles, new-object allocation occurs in only one of the semi-spaces. When the next collection cycle arrives, the reachable objects in that semi-space are copied compactly into the other semi-space, which is the one into which new objects will be allocated during the next inter-cycle period of mutator execution. In this and many other types of collectors, an "age" value associated with each young-generation object will be incremented every time that object survives a cycle, and the object will typically be promoted into the old generation once it reaches a predetermined age.

Independently of which of these or other techniques the collector uses to preserve reachable objects, the young generation that results is usually much richer in references to the old generation than the old generation is in references to the young one. So, when the old generation is eventually collected, it is efficient to traverse the entire young generation to look for such references rather than keep remembered sets and search only the regions thus identified. We have recognized that this aspect of most conventional collectors' operation provides an opportunity for reducing write-barrier use. Since remembered sets do not need to contain entries that identify young-generation locations, there really is no need for the mutator to have employed write barriers in connection with its writing references in young-generation objects. According to the invention, therefore, the compiler in some cases omits write barriers for write operations that modify references in young-generation objects.

But this raises the question of how the compiler can "know" whether the instruction it is producing results in writing a reference into a young-generation object. To appreciate this problem, consider the fact that even an initializing write into a newly allocated object cannot be guaranteed to result in writing into a young-generation object. The processor system's scheduler, for example, may interrupt the mutator between its allocation of an object and its initializing write operation into one of that object's fields, and the interruption may include a collection cycle in which that object is promoted into the old generation.

But the present invention prevents such an outcome. It does so by causing the collector to employ a promotion policy that depends (typically among other things) on where mutator execution was when the collection cycle began. The particular way in which the compiler accomplishes this is not critical to the present invention, but we will describe a couple of example mechanisms below. In both examples, the compiler in some fashion designates certain objects as what we will call "pinned" when they are initially allocated. This means that they cannot be promoted. Usually, the compiler in some fashion will also designate a point in a code segment that follows a pinned object's allocation as being its "unpinning" point. (There may be more than one unpinning point for a given allocation if the code branches after the allocation.) The compiler does not include a write barrier with any write operation to an object's fields if they occur between the object's allocation point in the code and the point in the code designated by the compiler as being the object's unpinning point. At run time, the collector refrains from promoting an object thus designated as pinned until the mutator's code execution has passed the object's unpinning point.

Figures 7, 10, 11:
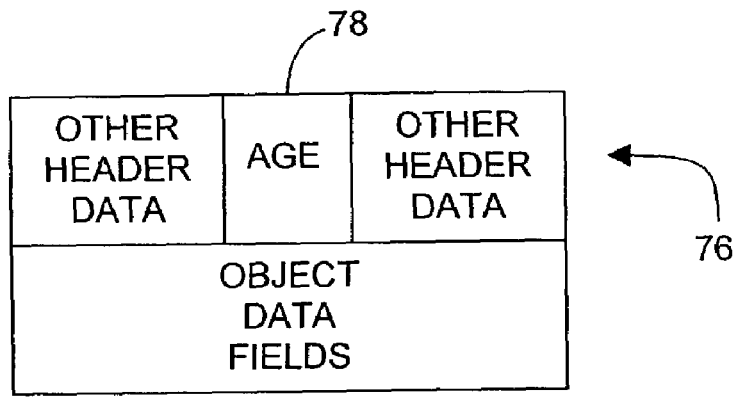
FIG. 7 is a simplified diagram of a typical object format.
FIG. 10 is a source-code listing that illustrates the fact that the amount of heap space needed to be provided by a given allocation cannot be determined statically.
FIG. 11 is another source-code listing used to illustrate such a process.

One convenient way of implementing this technique is to employ a field in the object itself to indicate whether the object is pinned. For example, an object's age field may be employed for this purpose. FIG. 7 is a diagram of a typical object format employed by an object-oriented-language compiler. In addition to the object data that the source code says the object should contain, the memory space occupied by the object typically will also include certain "overhead" information used in support of object management. Such overhead information typically occupies a "header" 76. Header formats vary widely, but the headers of objects in systems in which young-generation-object age is a promotion criterion usually include an age field 78, whose contents typically represent the number of collection cycles the object has survived. In the first collection cycle after an object is allocated, for example, the value that its age field contains may conventionally be zero, indicating that it has not yet survived any collection cycles. The collector will then increment the age field's contents in each collection cycle in which it recognizes the object as reachable.

One way of implementing the present invention's teachings is instead to use the value of zero as indicating that the object is still "pinned." The compiler in most of the present invention's embodiments will not cause all objects to be pinned. When the mutator initially allocates an object not to be pinned, it will place a one in the age field to indicate that it has not yet survived a collection cycle. For pinned objects, though, the age value will be a zero. When an object's age field has this value, the collector not only will refrain from promoting the object—as it conventionally would not if the age field is zero—but also will not increment that field's contents in response to the object's surviving the collection.

Instead, it will be the mutator that changes the age field from its zero, pinned-indicating value. Specifically, the compiler will have placed at the unpinning point instructions for incrementing the age field. The mutator thus informs the collector that the unpinning point has been passed and thus that, because write barriers guard any subsequent writes to a reference field in that object, promotion can now occur.

Figure 8:
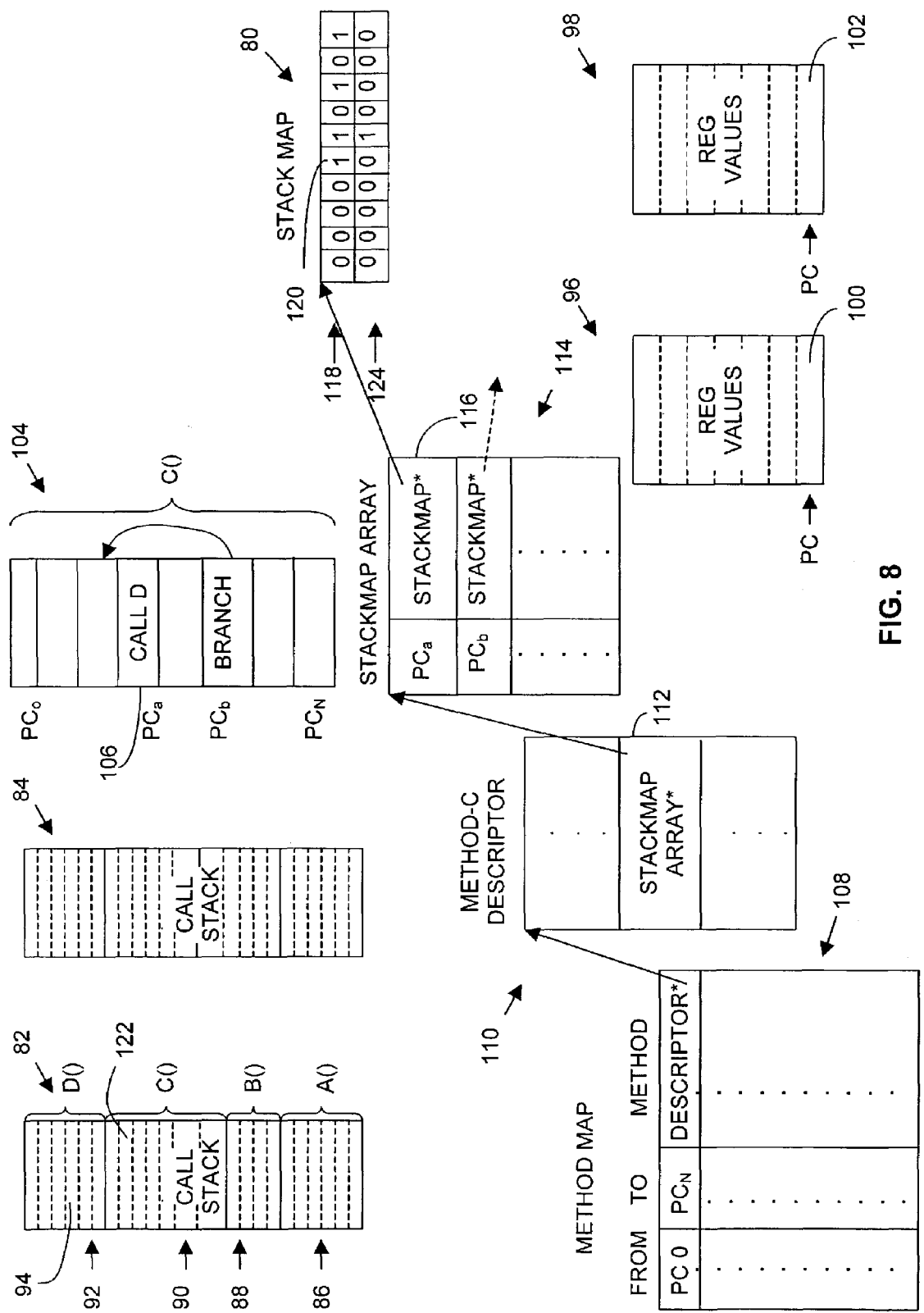
FIG. 8 is a data-structure diagram that illustrates support of stack-map use.

To illustrate how varied are the ways in which the collector can be advised of an object's pinned nature, we will employ the data-structure diagram of FIG. 8 to illustrate an approach that uses "stack maps" instead of object headers to provide the collector with information as to whether various objects are pinned. The approach to be illustrated by this drawing takes advantage of the fact that collector operation typically requires the use of data structures that identify reference locations.

As was stated above, the collector follows chains of references from the root set. To do this, it must know which of the values in the root set are heap references, i.e., are references to dynamically allocated objects. A structure conventionally employed for this purpose is known as a "stack map," and a compiler that targets a garbage-collected system usually provides stack maps as part of its output. As will presently be explained, each stack map is associated with a respective point in the code and identifies where references are when execution reaches that point. FIG. 8 includes a representation 80 of a stack map that has been enhanced in such a way as to support one approach to implementing the present invention's teachings.

To illustrate how stack maps are used, FIG. 8 also includes representations of two call stacks 82 and 84 associated with respective threads of execution. Each stack includes one or more stack frames associated with respective active methods. In stack 82, for instance, frames 86, 88, 90, and 92 are respectively associated with methods A( ), B( ), C( ), and D( ); method A( ) has called method B( ), which has called method C( ), which has called method D( ). Each stack frame contains one or more data slots such as frame 92's data slot 94, and data slots may contain references to dynamically allocated objects. The machine's registers, too, may contain such references, and FIG. 8 employs reference numerals 96 and 98 to represent data structures containing the register values for respective threads. Among the register values is the program counter, which reference numerals 100 and 102 identify for different threads.

The stack map 80's purpose is to identify the stack-frame and register entries that contain heap pointers at a given point in the program's execution. But register and stack-frame contents tend to change as a method's execution proceeds, and it is usually considered too onerous to maintain a reference-location-identifying stack map corresponding to every possible point within a method's execution. So a typical approach to providing such maps is to require that the garbage collector—which is what needs the stack maps—preempt mutator execution only when all of the mutator threads are at predetermined "GC points," for which the compiler has provided stack maps.

If FIG. 8's block 104 represents the locations containing method C( )'s instructions corresponding to program-counter values $PC_0$ through $PC_N$, for instance, typical instructions chosen as GC points may be, say, the method call 106 at $PC_a$ and a backwards branch at $PC_b$. For each of these points, the compiler generates a respective stack map, such as map 80. When a collector is to perform a cycle, the system's scheduler preempts all of the mutator's threads at such GC points and then transfers control to the garbage-collector thread.

One way in which the scheduler may identify such GC points at run time is to consult a method map 108 created by the run-time system as it loads the program's various methods. The method map may, for instance, be a list of beginning and ending program-counter values for the various active methods. For each such pair of program-counter values, the map may additionally contain some type of descriptor of the method or, as FIG. 8 shows, a pointer to such a descriptor 110. Among that descriptor's contents will be a list of GC points or, as FIG. 8 shows, a pointer 112 to a data structure containing such a list. For each thus-listed GC point, that structure will contain a corresponding stack map or, as FIG. 8 shows, a pointer to one. Pointer 116, which points to stack map 80, is such a pointer.

One row 118 in FIG. 8's illustration of an exemplary stack map represents conventional stack-map contents. In the example, each bit in row 118 represents a register or a stack-frame slot. For example, bit position 120 may correspond to stack-frame slot 122, and that bit position's binary value indicates whether slot 122 contains a heap reference. From a given mutator thread's program-counter value, therefore, the collector can find the heap-pointer locations in a given thread's register contents and its top stack frame. From the return addresses passed to the callee methods that correspond to the various stack frames, it can similarly identify heap pointers in the stack frames corresponding to the callers.

This much of the stack map's use is conventional. But one way to implement the present invention's teachings is for the stack map to include further contents at least for each heap-pointer location. In the FIG. 8 example, the further contents take the form of a second row 124 of bit positions similarly corresponding to respective registers and frame slots. The contents of a bit position in this row indicate whether the corresponding reference is one that points to a pinned object. In implementing this approach, the collector notes the pinned/unpinned state of the object to which the thus-identified reference points. If the stack map indicates that the object to which the reference points is pinned, the collector will not promote that object even though the object otherwise meets the collector's promotion criteria.

In comparison with the previous approach, this one is even more inexpensive to implement from a mutator-performance perspective. In the previous approach, the mutator must include an instruction for unpinning the object by writing a value into its header or some other location that indicates whether the object is pinned. In contrast, the stack-map approach requires no action on the mutator's part to change the object from its pinned state to its unpinned state: unpinning imposes no mutator-performance cost.

On the other hand, some implementers may prefer the previous approach because stack-map use does require some care in implementation. In the previous approach, the information concerning an object's pinned state is stored as a property of the object, so the collector will know whether an object is pinned or not as soon as it encounters the object. In the stack-map approach, though, that state information is associated only with references to the object. A reference can be identified by multiple stack maps, some of which may be associated with GC points that occur before the object's unpinning point and others of which may be associated with GC points that occur thereafter. So not all stack maps that identify references to a object will identify the referred-to object as being pinned. To implement the stack-map approach, therefore, a collector may postpone its decision as to whether an object should be promoted until after the entire root set has been processed. As the collection cycle proceeds, for instance, the collector may maintain a list of objects that have tentatively been identified as qualifying for promotion, and it can remove an object from that list if a subsequently encountered stack map indicates that the object is pinned.

But some implementers will prefer for the collector to make the promotion decision when the collector first encounters the object during a collection cycle. To enable the collector to proceed in that manner, certain steps can be taken to ensure that the collector encounters a pinning pointer to an object before it encounters any non-pinning pointer to the same object. Combining the following three provisions, for example, is one way to achieve this.

First, the compiler should so arrange the stack maps that an object is pinned only while it is provably thread-local, i.e., while it is reachable only from roots in a thread that allocated it. There are several conventionally employed analyses for proving thread locality, a property that is also useful for other purposes.

The second provision is to have all of the collector's scanning of thread-stack references occur before the collector recursively scans the references in any objects to which thread-stack references refer. In many instances, this requires no modification to conventional collectors.

The third provision is to process the thread stack from caller to callee and, within each stack frame, to scan all pinning pointers first. A pinned object will be pinned by a pointer in the method that allocated it. By processing in caller-to-callee order, the collector will process the frame associated with the allocating method before it processes a stack frame that contains a pointer to that object but does not identify it as pinned.

The decision as to whether to pin a given object and, if so, where to unpin it will be made in accordance with policy choices made by the implementer; the particular choice is not critical to the present invention. To consider some factors that a compiler may use in deciding these questions, though, consider the code fragment of FIG. 9. FIG. 9's first line represents allocation of an object for which the compiler will be making a pinning decision. To make such a decision, the compiler will typically step through the code that follows the allocation. FIG. 9's second line represents a reference-writing operation, which will need to be guarded by a write barrier if object f, in which the reference is written, is not pinned into the young generation. When the compiler encounters such write-barrier occasions, it will consider them factors that weigh in favor of pinning that object; pinning's purpose is to avoid write barriers, and the more write barriers that pinning a particular object will avoid, the stronger the case will be for pinning it.

As the compiler continues stepping through the code, it encounters the fifth and ninth lines, which present further opportunities to avoid write barriers. On the other hand, the third line's allocation of a new object (in the young generation) may be considered a factor that weighs against pinning.

To understand why, recall that the young-generation size is usually selected to be relatively small, because a small young-generation size makes for small collection-cycle delays and usually enhances the collector's garbage-identification efficiency. When the young generation gets filled up, a collection cycle is triggered to clean out the young generation by reclaiming garbage-object space and promoting any promotable objects. But reachable pinned objects can neither be promoted nor have their space reclaimed. An excess of pinned objects could therefore leave the young generation nearly filled even right after a collection cycle. In the worst case, collection operation could thereby be stopped completely.

So pinning will appear less attractive if other object allocations occur among the reference-write operations for which the pinning is provided. The compiler may therefore base its decision on a figure of merit that, as will be discussed further below, takes into account the number of bytes that such other allocations involve, at least if the other allocations also are potentially allocations of pinned objects.

If the collector does decide to pin an object, it will usually also need to select a location in the code where unpinning should occur. Now, it is not absolutely necessary that there be an unpinning point for every pinned object; some objects can be guaranteed to become garbage soon after allocation, for instance. Also, some may contain reference fields that will be written so frequently that it makes sense to let them occupy the young generation throughout their lives. But most will need to be unpinned.

Selection of the pinning point can be based on many different factors; different implementations will differ in this regard. As an example of a factor that a compiler can take into account in deciding where to place an unpinning point, consider FIG. 9's seventh line, where the code includes a subroutine call. If the implementation is a fairly simple one, the presence of a subroutine call will typically cause the compiler to place an unpinning point just ahead of the call, since the callee method may itself pin more objects. As will be discussed below, the compiler can instead avoid thus placing the unpinning point in some cases; it can inspect the called method's code to determine how much allocation it performs. But the implementer may not want to make the compiler complex enough to examine callee methods.

Indeed, it may not even be possible at compile time to determine what number of bytes a given method will allocate. The class constructor beginning in FIG. 10's third line, for example, results in allocation of $2^n$ objects, where n is an argument whose value may not be known at compile time. To avoid the potential for thus contributing to an excess of pinned objects in the young generation, a compiler may therefore place the pinning point between the reference-writing operation in FIG. 9's second line and the branch in its fourth line. Or it may provide two unpinning points, one at the end of the "then" branch, i.e., between the fifth and sixth lines, and one at the beginning of the "else" branch, i.e., between the sixth and seventh lines. Alternatively, because the resultant avoidance of only a single write barrier may not be considered enough of a savings to justify the pinning process, the compiler may simply decide not to pin object f at all.

FIG. 11 includes a code fragment that illustrates another type of location at which the compiler would typically place an unpinning point. The decision as to whether to pin the object f allocated in the second-line step will typically be made when the compiler reaches the fourth line. Beyond that point, the local variable f which is the only reference to object f has gone out of scope, so object f has already become garbage. (Actually, it is possible—but very bad form—for the constructor Foo( ) to have been so written as to cause a reference to the newly allocated object to be stored in some globally accessible location, in which case that object would not be garbage after the variable f goes out of scope. For the sake of discussion, though, we will assume that Foo( ) does not exhibit such pathological behavior.) At the fourth line, the compiler can decide either not to pin object f (because it is known at compile time to be garbage by then) or to unpin it in the "then" branch (i.e., after the third line).

We now return to FIG. 9 to discuss the topic, broached briefly above, of avoiding an excessive population of pinned objects in the young generation. This time, let us assume that the compiler actually does analyze callee methods and has determined that the function call in the seventh line reliably allocates a fixed number of bytes dynamically. Let us further assume that the third-line step results in dynamic allocation of a known number of bytes. In making its pinning determination for the object allocated in FIG. 9's first line, the compiler may step though the code of FIG. 9, adding up the number of write barriers avoided and separately adding up the number of bytes in other pinned objects thereafter dynamically allocated. In doing so, it may add the number of bytes allocated in the third-line step to the number allocated by the method called in the seventh-line step. And it may, say, weight the resultant write-barrier and allocated-byte totals separately and make its decision in accordance with the sign of the difference between the weighted totals.

At the point where this calculation is made, the compiler may not yet know whether, for instance, FIG. 9's object b will be pinned. In that case it may assume on a provisional basis that it will be. If the resultant decision based on this assumption is that object f should not be pinned, then the collector may revisit that decision if it later determines that object b will not be pinned.

Figure 12:
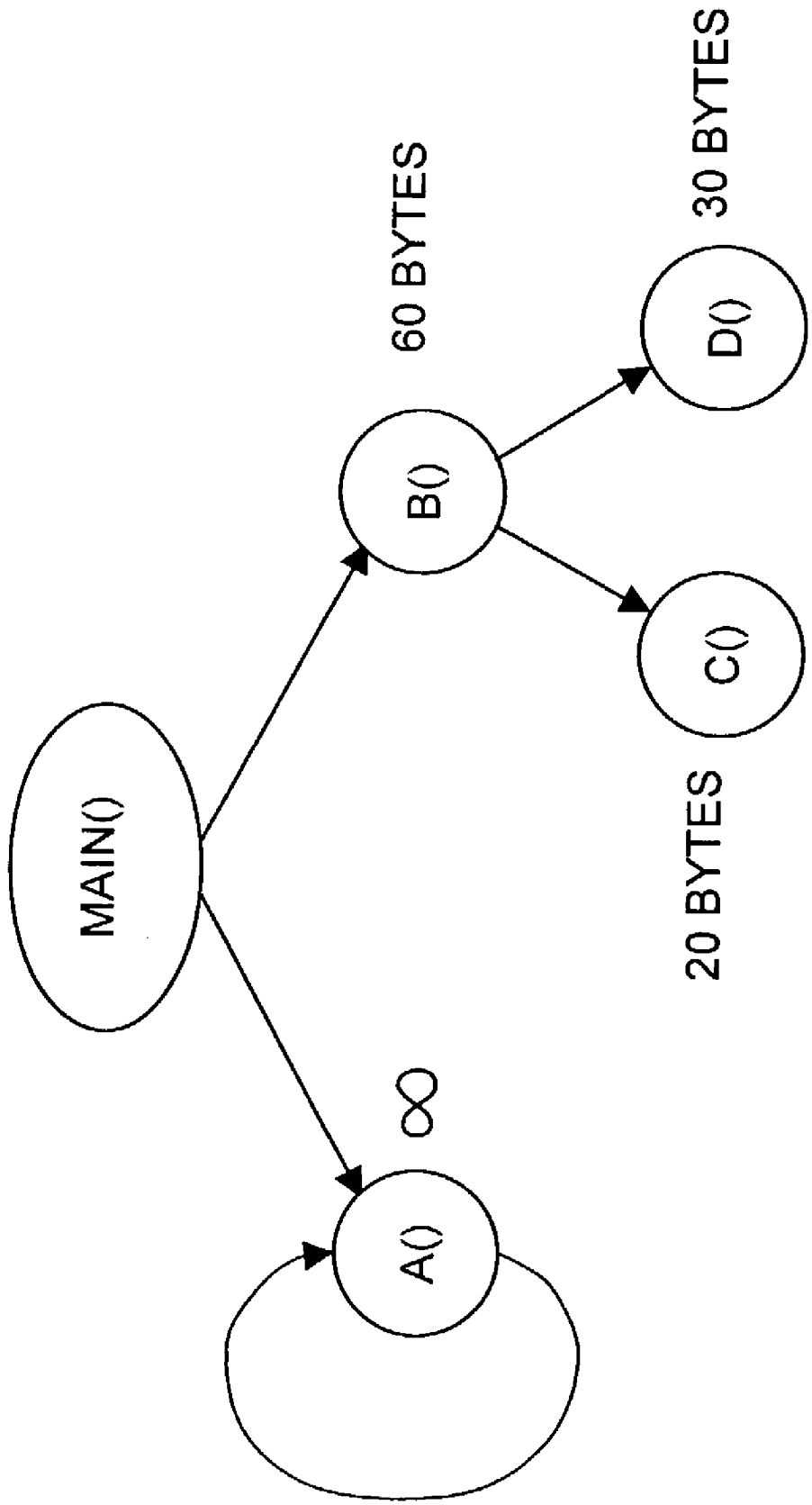
FIG. 12 is a method-call graph used to illustrate the process of deciding whether to do what below will be referred to as "pinning" newly allocated objects.

To avoid such provisional decision-making but still base pinning decisions on how much allocation callee methods will perform, a methodical way of dealing with subroutine calls is for the compiler to construct all or part of the program's method-call graph and make pinning decisions for the various methods' allocations in a bottom-up traversal in which it scores the various methods for the maximum number of pinned bytes there may be at any one time in the objects that they allocate. In the call graph of FIG. 12, for instance, assume that analysis reveals that method D( ) will sometimes cause no pinned-object allocation at all but that it sometimes allocates as many as thirty bytes of pinned objects. The compiler will assign D( ) a score of thirty.

Suppose now that a similar analysis of method C( ) results in a score of twenty and that method B( ) has two branches, in which it respectively calls methods C( ) and D( ). Further assume that the branch in which method B( ) calls method D( ) includes allocation of forty bytes of object storage but that, because of method D( )'s score, the compiler makes the decision not to pin the objects allocated in that branch. If method B( ) allocates forty bytes of pinned objects in the branch in which it calls method C( ), the resultant score for method B( ) would be sixty. The collector will use B( )'s score in determining whether to pin objects that main( ) allocates and in determining when to unpin those objects.

Method main( ) will also need to use a score for method A( ). As FIG. 12 indicates, though, method A( ) can call itself recursively, and it may well be impossible at compile time to determine how many recursions will occur. The compiler may deal with this in a number of ways. As FIG. 12 suggests, it could simply assign that method a score of infinity, in which case the main( ) method will, before it calls method A( ), unpin any pinned objects that it has allocated. Alternatively, the compiler, noting that method's recursive nature, could simply avoid pinning any objects allocated during that method's execution. In that case, the recursive method's score would be zero. As another alternative, the compiler could take a middle path, putting some pinning into method A( ) but unpinning all such objects before the point at which the method calls itself.

A source-code executor that embodies the present invention's teachings can take a wide variety of forms. For example, it can simply be a compiler whose input is programmer-written source code and whose output is a self-contained file, including object code for both the mutator and garbage collector, that is loaded on a target computer for run-time use. It can instead include both (1) a similar compiler running on one computer but generating a file containing machine code for the mutator only and (2) a run-time system, containing the machine code for the garbage collector, that runs on a computer that the compiler targets.

Many other forms are possible, too. Probably the most typical will be part of a virtual machine, such as an implementation of the Java Virtual Machine, whose input is class files containing the Java byte codes usually produced by Java-programming-language compiler, or an implementation of the run-time system employed to execute the intermediate-language codes usually produced by C# compilers. In these cases, the pinning decisions would not be made in the Java Programming Language or C# compiler but rather in just-in-time compilers employed in the virtual machines to convert the byte-code or intermediate-language representations into machine code.

From the preceding discussion, it is apparent that the present invention enables a mutator to avoid many write barriers that would conventionally be required. It thus constitutes a significant advance in the art.

What is claimed is:

1. A source-instruction executor that, in response to source code that specifies operation of a mutator that includes at least one dynamic allocation in a heap of an object that includes a reference field:
   A) runs the mutator and a garbage collector that so manages the heap as to organize it into a young generation and an old generation and relies on results of write-barrier execution to keep track of references located in the old generation but not to keep track of those located in the young generation;
   B) chooses at least one said dynamic allocation to be an allocation of an initially pinned object;
   C) causes the allocation of the initially pinned object to occur in the young generation;
   D) assigns a respective unpinning point in the mutator to at least one said allocation of an initially pinned object;
   E) causes a source-code-specified write operation to a reference field of an initially pinned object to be performed without a write barrier if that write operation occurs before the unpinning point assigned to that initially pinned object's allocation;
   F) causes a source-code-specified write operation to a reference field of an initially pinned object to be performed with a write barrier if that operation occurs after the unpinning point assigned to that initially pinned object's allocation; and
   G) causes the garbage collector to promote an initially pinned object from the young generation to the old generation if and only if that initially pinned object meets promotion criteria that include the mutator's having reached the unpinning point assigned to that initially pinned object's allocation.

2. A source-code executor as defined in claim 1 wherein:
   A) the mutator places in a pin-indicator field of the initially pinned object an indication of its pinned condition when it is allocated and removes that indication when the mutator reaches the unpinning point assigned to that object's allocation; and
   B) the garbage collector determines whether the mutator has reached the unpinning point assigned to the initially pinned object's allocation by reading the contents of the object's pin-indicator field.

3. A source-code executor as defined in claim 2 wherein, when an object is not pinned, the garbage collector uses the pin-indicator field as an age field to indicate how many garbage-collection cycles the object has survived.

4. A source-code executor as defined in claim 1 wherein:
   A) the source-code executor generates, for respective collection points in the mutator, stack maps containing pin-indicator entries, associated with respective references, that indicate whether the objects to which the references refer are pinned at the collection points for which the stack maps were generated; and
   B) the garbage collector uses the pin-indicator entries associated with references to the initially pinned object to determine whether the mutator has reached the unpinning point assigned to the initially pinned object's allocation.

5. A source-code executor as defined in claim 1 wherein the source-code executor bases a determination of whether an object allocated by an allocation in the mutator will be initially pinned on a function of the amount of memory allocated to pinned objects within some portion of the mutator that includes that allocation.

6. A source-code executor as defined in claim 1 wherein the source-code executor bases a determination of whether an object allocated by an allocation in the mutator will be initially pinned on a function of the number of times a write operation to a reference field in the object occurs in some portion of the mutator that follows that allocation.

7. A source-code executor as defined in claim 6 wherein the source-code executor bases a determination of whether an object allocated by an allocation in the mutator will be initially pinned on a function of the amount of memory allocated to pinned objects within some portion of the mutator that includes that allocation.

8. A source-code executor as defined in claim 1 wherein:
A) the mutator includes mutator methods that call other mutator methods; and
B) to determine whether the object allocated by at least one allocation in one such mutator method will be initially pinned, the source-code executor traverses the call graph of mutator methods called by that mutator method and computes the amount of memory potentially allocated to pinned objects by the mutator methods thus encountered.

9. For executing a mutator that dynamically allocates in a heap objects that include reference fields, a method including:
A) running the mutator and a garbage collector that so manages the heap as to organize it into a young generation and an old generation and relies on results of write-barrier execution to keep track of references located in the old generation but not to keep track of those located in the young generation;
B) choosing at least one said dynamic allocation to be an allocation of an initially pinned object;
C) allocating the initially pinned object in the young generation;
D) assigning a respective unpinning point in the mutator's execution to at least one said initially pinned object;
E) performing a source-code-specified write operation to a reference field of an initially pinned object without a write barrier if that write operation occurs before that initially pinned object's unpinning point;
F) performing a source-code-specified write operation to a reference field of an initially pinned object with a write barrier if that operation occurs after the unpinning point assigned to that initially pinned object's allocation; and
G) causing the garbage collector to promote an initially pinned object from the young generation to the old generation if and only if that initially pinned object meets promotion criteria that include the mutator's having reached the unpinning point assigned that initially pinned object's allocation.

10. A method as defined in claim 9 wherein:
A) the mutator places in a pin-indicator field of the initially pinned object an indication of its pinned condition when it is allocated and removes that indication when the mutator reaches the unpinning point assigned to that object's allocation; and
B) the garbage collector determines whether the mutator has reached the unpinning point assigned to the initially pinned object's allocation by reading the contents of the object's pin-indicator field.

11. A method as defined in claim 10 wherein, when an object is not pinned, the garbage collector uses the pin-indicator field as an age field to indicate how many garbage-collection cycles the object has survived.

12. A method as defined in claim 9 wherein:
A) the method further includes generating, for respective collection points in the mutator, stack maps containing pin-indicator entries, associated with respective references, that indicate whether the objects to which the references refer are pinned at the collection points for which the stack maps were generated; and
B) the garbage collector uses the pin-indicator entries associated with references to the initially pinned object to determine whether the mutator has reached the unpinning point assigned to the initially pinned object's allocation.

13. A method as defined in claim 9 that further includes basing a determination of whether an object allocated by an allocation in the mutator will be initially pinned on a function of the amount of memory allocated to pinned objects within some portion of the mutator that includes that allocation.

14. A method as defined in claim 9 that further includes basing a determination of whether an object allocated by an allocation in the mutator will be initially pinned on a function of the number of times a write operation to a reference field in the object occurs in some portion of the mutator that follows that allocation.

15. A method as defined in claim 14 that further includes basing a determination of whether an object allocated by an allocation in the mutator will be initially pinned on a function of the amount of memory allocated to pinned objects within some portion of the mutator that includes that allocation.

16. A method as defined in claim 9 wherein:
A) the mutator includes mutator methods that call other mutator methods; and
B) the method includes traversing, to determine whether the object allocated by at least one allocation in one such mutator method will be initially pinned, the call graph of mutator methods called by that mutator method and computes the amount of memory potentially allocated to pinned objects by the mutator methods thus encountered.

17. A storage medium containing instructions readable by a computer to configure the computer to operate as a source-instruction executor that, in response to source code that specifies operation of a mutator that includes at least one dynamic allocation in a heap of an object that includes a reference field: A) runs the mutator and a garbage collector that so manages the heap as to organize it into a young generation and an old generation and relies on results of write-barrier execution to keep track of references located in the old generation but not to keep track of those located in the young generation; B) chooses at least one said dynamic allocation to be an allocation of an initially pinned object; C) causes the allocation of the initially pinned object to occur in the young generation; D) assigns a respective unpinning point in the mutator to at least one said allocation of an initially pinned object; E) causes a source-code-specified write operation to a reference field of an initially pinned object to be performed without a write barrier if that write operation occurs before the unpinning point assigned to that initially pinned object's allocation; F) causes a source-code-specified write operation to a reference field of an initially pinned object to be performed with a write barrier if that operation occurs after the unpinning point assigned to that initially pinned object's allocation; and G) causes the garbage collector to promote an initially pinned object from the young generation to the old generation if and only if that initially pinned object meets promotion criteria that include the mutator's having reached the unpinning point assigned to that initially pinned object's allocation.

18. A storage medium as defined in claim 17 wherein:
A) the mutator places in a pin-indicator field of the initially pinned object an indication of its pinned condition when it is allocated and removes that indication when the mutator reaches the unpinning point assigned to that object's allocation; and
B) the garbage collector determines whether the mutator has reached the unpinning point assigned to the initially pinned object's allocation by reading the contents of the object's pin-indicator field.

19. A storage medium as defined in claim 18 wherein, when an object is not pinned, the garbage collector uses the pin-indicator field as an age field to indicate how many garbage-collection cycles the object has survived.

20. A storage medium as defined in claim 17 wherein:
A) the source-code executor generates, for respective collection points in the mutator, stack maps containing pin-indicator entries, associated with respective references, that indicate whether the objects to which the references refer are pinned at the collection points for which the stack maps were generated; and
B) the garbage collector uses the pin-indicator entries associated with references to the initially pinned object to determine whether the mutator has reached the unpinning point assigned to the initially pinned object's allocation.

21. A storage medium as defined in claim 17 wherein the source-code executor bases a determination of whether an object allocated by an allocation in the mutator will be initially pinned on a function of the amount of memory allocated to pinned objects within some portion of the mutator that includes that allocation.

22. A storage medium as defined in claim 17 wherein the source-code executor bases a determination of whether an object allocated by an allocation in the mutator will be initially pinned on a function of the number of times a write operation to a reference field in the object occurs in some portion of the mutator that follows that allocation.

23. A storage medium as defined in claim 22 wherein the source-code executor bases a determination of whether an object allocated by an allocation in the mutator will be initially pinned on a function of the amount of memory allocated to pinned objects within some portion of the mutator that includes that allocation.

24. A storage medium as defined in claim 17 wherein:
A) the mutator includes mutator methods that call other mutator methods; and
B) to determine whether the object allocated by at least one allocation in one such mutator method will be initially pinned, the source-code executor traverses the call graph of mutator methods called by that mutator method and computes the amount of memory potentially allocated to pinned objects by the mutator methods thus encountered.

25. A computer readable medium storing sequences of instructions that, when executed by a processor, cause it to operate as a source-instruction executor that, in response to source code that specifies operation of a mutator that includes at least one dynamic allocation in a heap of an object that includes a reference field:
A) runs the mutator and a garbage collector that so manages the heap as to organize it into a young generation and an old generation and relies on results of write-barrier execution to keep track of references located in the old generation but not to keep track of those located in the young generation;
B) chooses at least one said dynamic allocation to be an allocation of an initially pinned object;
C) causes the allocation of the initially pinned object to occur in the young generation;
D) assigns a respective unpinning point in the mutator to at least one said allocation of an initially pinned object;
E) causes a source-code-specified write operation to a reference field of an initially pinned object to be performed without a write barrier if that write operation occurs before the unpinning point assigned to that initially pinned object's allocation;
F) causes a source-code-specified write operation to a reference field of an initially pinned object to be performed with a write barrier if that operation occurs after the unpinning point assigned to that initially pinned object's allocation; and
G) causes the garbage collector to promote an initially pinned object from the young generation to the old generation if and only if that initially pinned object meets promotion criteria that include the mutator's having reached the unpinning point assigned to that initially pinned object's allocation.

26. A computer readable medium storing as defined in claim 25 wherein:
A) the mutator places in a pin-indicator field of the initially pinned object an indication of its pinned condition when it is allocated and removes that indication when the mutator reaches the unpinning point assigned to that object's allocation; and
B) the garbage collector determines whether the mutator has reached the unpinning point assigned to the initially pinned object's allocation by reading the contents of the object's pin-indicator field.

27. A computer readable medium storing as defined in claim 26 wherein, when an object is not pinned, the garbage collector uses the pin-indicator field as an age field to indicate how many garbage-collection cycles the object has survived.

28. A computer readable medium storing as defined in claim 25 wherein:
A) the source-code executor generates, for respective collection points in the mutator, stack maps containing pin-indicator entries, associated with respective references, that indicate whether the objects to which the references refer are pinned at the collection points for which the stack maps were generated; and
B) the garbage collector uses the pin-indicator entries associated with references to the initially pinned object to determine whether the mutator has reached the unpinning point assigned to the initially pinned object's allocation.

29. A computer readable medium storing as defined in claim 25 wherein the source-code executor bases a determination of whether an object allocated by an allocation in the mutator will be initially pinned on a function of the amount of memory allocated to pinned objects within some portion of the mutator that includes that allocation.

30. A computer readable medium storing as defined in claim 25 wherein the source-code executor bases a determination of whether an object allocated by an allocation in the mutator will be initially pinned on a function of the number of times a write operation to a reference field in the object occurs in some portion of the mutator that follows that allocation.

31. A computer readable medium storing as defined in claim 30 wherein the source-code executor bases a determination of whether an object allocated by an allocation in the mutator will be initially pinned on a function of the amount of memory allocated to pinned objects within some portion of the mutator that includes that allocation.

32. A computer readable medium storing as defined in claim 25 wherein:
A) the mutator includes mutator methods that call other mutator methods; and
B) to determine whether the object allocated by at least one allocation in one such mutator method will be initially pinned, the source-code executor traverses the call graph of mutator methods called by that mutator method and computes the amount of memory potentially allocated to pinned objects by the mutator methods thus encountered.

33. A source-instruction executor implemented on a memory of a computer that receives source code that specifies operation of a mutator that includes at least one dynamic allocation in a heap of an object that includes a reference field, the source-instruction executor including:
A) means for running the mutator and a garbage collector that so manages the heap as to organize it into a young generation and an old generation and relies on results of write-barrier execution to keep track of references located in the old generation but not to keep track of those located in the young generation;
B) means for choosing at least one said dynamic allocation to be an allocation of an initially pinned object;
C) means for causing the allocation of the initially pinned object to occur in the young generation;
D) means for assigning a respective unpinning point in the mutator to at least one said allocation of an initially pinned object;
E) means for causing a source-code-specified write operation to a reference field of an initially pinned object to be performed without a write barrier if that write operation occurs before the unpinning point assigned to that initially pinned object's allocation;
F) means for causing a source-code-specified write operation to a reference field of an initially pinned object to be performed with a write barrier if that operation occurs after the unpinning point assigned to that initially pinned object's allocation; and
G) means for causing the garbage collector to promote an initially pinned object from the young generation to the old generation if and only if that initially pinned object meets promotion criteria that include the mutator's having reached the unpinning point assigned to that initially pinned object's allocation.

* * * * *